Figure 1:
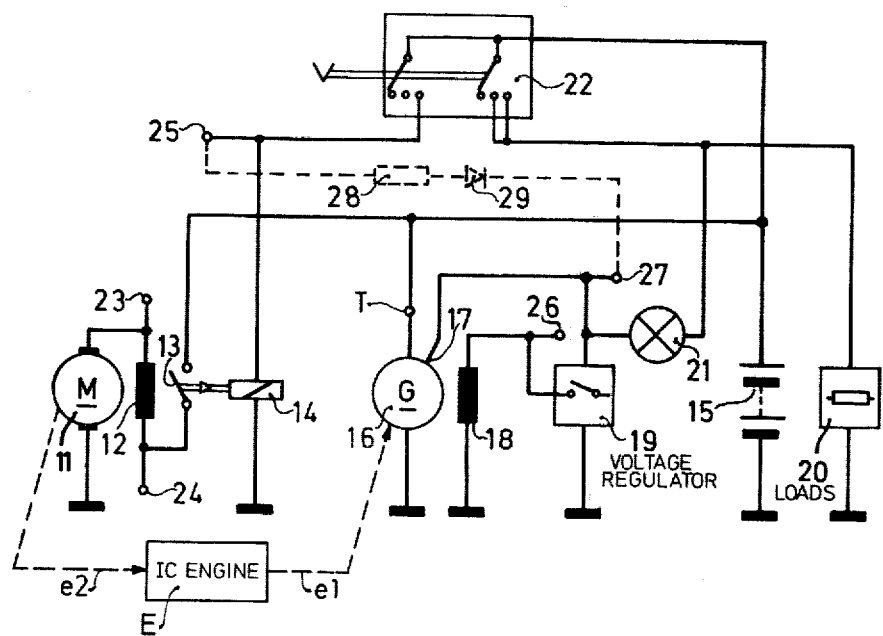

United States Patent [19]

Ragaly

[11] 4,301,376
[45] Nov. 17, 1981

[54] INTERNAL COMBUSTION ENGINE AND D-C FLOATING BATTERY SELF-CONTAINED ELECTRICAL NETWORK COMBINATION, PARTICULARLY FOR THE ON-BOARD NETWORK OF AUTOMOTIVE VEHICLES

[75] Inventor: Istvan Ragaly, Schwieberdingen, Fed. Rep. of Germany

[73] Assignee: Robert Bosch GmbH, Stuttgart, Fed. Rep. of Germany

[21] Appl. No.: 773,055

[22] Filed: Feb. 28, 1977

[30] Foreign Application Priority Data

Mar. 2, 1976 [DE] Fed. Rep. of Germany ....... 2608606

[51] Int. Cl.³ .............................................. F02N 11/04
[52] U.S. Cl. ..................................... 290/36 R; 322/88
[58] Field of Search ........................ 290/36 R; 322/88

[56] References Cited

U.S. PATENT DOCUMENTS

| | | | |
|---|---|---|---|
| 3,086,161 | 4/1963 | DeCarbo et al. | 322/88 |
| 3,247,441 | 4/1966 | Kimbleton | 322/88 |
| 3,270,208 | 8/1966 | Carlson | 290/36 R |
| 3,585,490 | 6/1971 | Zelina | 322/88 |

*Primary Examiner*—J. V. Truhe
*Assistant Examiner*—Eugene S. Indyk
*Attorney, Agent, or Firm*—Frishauf, Holtz, Goodman & Woodward

[57] ABSTRACT

To provide for improved starting and rapid supply of power from a generator coupled to an internal combustion engine, typically an automotive-type engine, a connection is provided between the starter network and the field of the generator coupled to the internal combustion engine to supply power from the on-board battery network of the vehicle to the field winding of the generator upon starting so that the field will be externally excited during starting, the generator thereby being provided immediately with field current and not relying on remanent magnetism for supply of power therefrom.

11 Claims, 5 Drawing Figures

INTERNAL COMBUSTION ENGINE AND D-C FLOATING BATTERY SELF-CONTAINED ELECTRICAL NETWORK COMBINATION, PARTICULARLY FOR THE ON-BOARD NETWORK OF AUTOMOTIVE VEHICLES

The present invention relates to self-contained d-c power networks which are supplied with electrical power from a generator, charging a battery, the generator being driven by an internal combustion engine subject to intermittent operation, and having a starter motor connected to the battery, and more particularly to the on-board network of automotive vehicles.

BACKGROUND AND PRIOR ART

The present invention is especially directed to automotive vehicle network systems, but can also be applied, equally, to stationary self-contained electrical systems; for simplicity, therefore, an "automotive-type" engine is referred to, and the specification will be directed specifically to self-contained networks for automotive use, although the present invention is equally applicable to stationary engines, and connected self-contained networks.

Automotive vehicles customarily use generators, driven by the internal combustion (IC) engine of the vehicle, the generator charging a battery. For starting, a motor is provided, supplied with power from the battery and energized by a suitable starter switch. To provide accurate voltage control, most generators use field structures which are of soft iron so that the degree of magnetism of the field structure can be accurately controlled. A certain remanent magnetism, however, remains and this remanence is used to provide the initial field for the generator upon start-up. The generator, thus, is initially self-excited after the engine has started. The self-excitation should be so reliable, however, that after starting of the engine, the generator can supply power to the on-board network of the vehicle as quickly as possible, particularly since starting places a heavy drain on the battery. The battery, therefore, should be promptly recharged.

It has been found that in many installations the magnetic remanence is not sufficient in order to ensure self-excitation. Various circuits have therefore been provided in order to improve or ensure self-excitation. Most of those circuits and systems are complex. One of such systems uses the circuit including the charge control lamp—usually provided—of the automotive vehicle of which the engine and the control system are a part. Operability and excitation thus will depend on the power capability of the charge lamp and on its operability. Self-excitation becomes increasingly difficult as the air gap of the generator itself increases, and is particularly difficult to obtain in generators not using slip rings. Self-excitation additionally depends on the charge state of the battery, battery voltage, frequency of starting, or attempts to start, and on the other loads already connected to the battery, and thus also loading the generator. Ambient temperature also has effects on the excitation of the generator.

THE INVENTION

It is an object to insure excitation of the generator also under unfavorable operating conditions, and especially to enable the generator to become effective to recharge the battery as soon as the engine has started. A successful attempt to start the engine will thus result in rapid recharging of the engine, independent of the number of attempts to start the engine beforehand, battery voltage, or remanence remaining in the generator from prior use, the condition of the charge control lamp or other circuitry, and loading placed on the generator.

Briefly, a connection is provided between the starter circuit of the starter motor and the field of the generator, typically an alternator, to provide field current to the generator when the starter circuit is energized upon closing of the starter switch. As soon as the engine has started, and the starter circuit is then again de-energized, this connection is automatically broken. The connection includes a diode poled in a direction to pass current from the battery to the field winding of the generator during starting of the engine and, preferably, additionally includes a current limiting resistor to limit current flow to the field of the generator when the connection to the generator field is energized.

The actual condition, and circuit of the indicator lamp, or indicator instrument or circuitry to indicate charging operation of the generator is no longer relevant for generator output. This permits reducing the power rating and current passing capacity of the indicator lamp to a minimum, and to use, for example, a light-emitting diode (LED) as a charge state indicator. The indicator will then only serve as an indication of current flow from, or to the battery. The additional excitation is provided only so long as the starter switch is enabled, or the starter is actually connected by a starter relay; as soon as the starter motor is de-energized, the additional field excitation is disconnected; at that time, the generator can become self-excited, while already providing power.

The additional excitation circuitry to provide for power flow to the field of the generator, typically an alternator, preferably includes an ohmic resistor. This resistor is used to decrease the excitation current during starting, for example in order to avoid difficulties with overheating of slip rings, or excessive field current flow and burning of brushes. A diode is used, preferably, to positively isolate the circuit of the starter motor from the battery in reverse current direction.

The system permits various connecting possibilities for the connection networks. It can be used with any type of generator, and any type of starter, and is particularly applicable to alternators and can also be used with alternators which either have diodes providing for separate field excitation current as well as diodes in which the field is directly connected to the output, with or without blocking diodes; the circuit is also useful for generators without slip rings.

DRAWINGS

Figure 2:
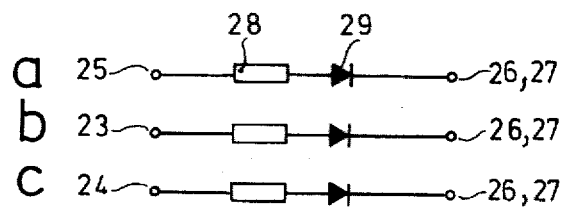

Illustrating an example:

FIG. 1 is a schematic circuit diagram of the system in accordance with the present invention; and FIG. 2, collectively, in views FIG. 2a, FIG. 2b, FIG. 2c, shows several variations of connections which are possible in the system of FIG. 1.

An internal combustion engine E of the automotive type is drivingly connected, as indicated by broken line e1, to a generator 16, shown in the example as a three-phase alternator with a built-in rectifier unit to provide rectified output power at a terminal T. To start the engine, a starter motor 11 is energized, starter motor 11 being coupled to the IC engine, as well known, by an over-running clutch connection e2. The relative directions of power flow in connections e1, e2 are indicated by the arrows on the broken lines.

The starter motor 11 has a field winding 12. As is customary, the starter motor is series connected and energized by a starter circuit including a starter relay having relay terminals 13 and a relay switch energization coil 14. The free end of the armature of the starter motor 11 is connected to a source of reference potential or ground, typically the chassis of an automotive vehicle. Switch 13 is connected to the positive terminal of the vehicle battery B, the negative terminal of which is connected to chassis. The generator 16 has its output terminal T also connected to the positive terminal of the battery. The type of generator shown in the drawings has a separate set of rectifier diodes to provide rectified direct current power for the field 18 of the generator. The output terminal of the exciter rectifier diodes is shown at 17. One terminal of the field 18 is connected to chassis, the other one being connected to a voltage regulator 19. The voltage regulator 19 establishes a series connection from the exciter diode 17 to the generator field 18, as schematically indicated by the switch contacts in the voltage regulator, when the output voltage of the generator drops below a predetermined value. A charge supervisory lamp 21 is connected between the input to the voltage regulator and a terminal of a combination ignition-starter switch 22. The starter switch 22 has its other switch terminal connected to the positive bus from battery 15. Loads, schematically indicated at 20, can additionally be connected to the battery when the switch 22 is operated to the ON position. Such additional loads may be the ignition for the IC engine E, lights, heaters, radios, and other accessories. The starter circuit further includes a "start" terminal on the switch 22 to energize starter relay 14. The "start" position of the switch 22 preferably is unstable, for example spring-loaded.

For a better understanding of the invention, various junction or terminal points have been given separate reference numerals: The junction between the armature of the starter motor 11 and its field 12 is indicated at terminal 23; the junction between the field 12 of the starter motor and the relay contact 13 is shown at 24. The terminal of the starter relay coil 14 which is connected to switch 22 is indicated at 25. Junctions 23, 24, 25 thus are connected to the starter circuit. The junction between the free terminal of the generate field 18 and the voltage regulator 19 is shown at 26. The input to the voltage regulator 19 and also forming the junction with the charge supervisory lamp 21 is shown at 27.

In accordance with the present invention, and in order to provide exciter current to the field 18 of the generator 16 during starting, a connection is effected between the starter circuit and the generator field, e.g. between terminals 25 and 27, as shown by the broken lines. This connection includes a resistor 28 and a diode 29. Since this connection could also be effected differently, it is shown in FIG. 1 only in broken lines, and will be explained in greater detail in connection with FIG. 2.

The diode is so poled that, upon operation of the starter relay 14, current can flow through resistor 28 and diode 29 to the voltage regulator 19 and hence to the exciter field winding 18 of the generator 16.

FIG. 2, collectively, shows various possible network arrangements of the connection formed by the resistor 28 and diode 29. Resistor 28 is provided to limit the maximum possible auxiliary excitation current which can flow through the field winding 18. Diode 29 is a blocking diode and effective during the time when the generator is excited, to prevent flow of current in reverse direction from the generator 16 into the starting relay, or into the starting motor. Auxiliary excitation is thus reliably provided by ensuring that, during starting, current can flow directly from the battery 15 through the diode into the exciter winding 18.

First connection, FIG. 2a: The resistor-diode circuit 28, 29 is connected between terminals 25, 27 as shown in broken lines in FIG. 1, and in full line in FIG. 2a.

Second connection, FIG. 2c: The resistor-diode connection 28, 29 is connected between terminal 24 and terminal 26 (FIG. 1). Alternatively, the connection could also be made between terminal 24 and terminal 27. During starting, that is, when the starter relay 14 is enabled, current is supplied from the battery through the starter relay to the excitation winding 18. As soon as the starter motor is de-energized, that is, upon opening of starter relay switch 13, the terminal 24 is effectively grounded through the armature of starter motor 11. Diode 29 prevents reverse current flow.

Third connection, FIG. 2b: Terminal 23, the junction between the series field 12 and the armature 11 of the starter motor M is connected through the resistor-diode network 28, 29 to terminal 26 or terminal 27. The operation will be similar to that explained in connection with FIG. 2c.

The first circuit, as schematically shown by the broken lines of FIG. 1, can also be connected between terminals 25 and 26. If any one of the connections of any one of the circuits is connected to terminal 27, as shown in FIG. 1, then the additional current from battery 15 will not flow directly into the excitation winding 18 but rather will flow through the voltage regulator 19; a direct connection is provided by connecting the respective positive supply to terminal 26. The illustration as selected shows an alternator having internally connected rectifiers, preferably in a three phase bridge connected thereto to provide a direct current output at terminal T and, further, to have exciter rectifiers to provide an exciter rectified output at line 17. The circuit is equally applicable to other types of generators, for example alternators without separate excitation diodes. In such systems, the resistor-diode connection 28, 29 can then be connected between any one of the terminals 23, 24, 25 and either one of the terminals 26, 27, as explained above. A similar connection can be provided for d-c generators.

Diode 29 must have a current carrying capability which is matched to current flow through winding 18 and to provide suitable excitation current therefor. For structural simplicity, the resistor-diode group forming the connection 28, 29 can be directly incorporated in the generator 16, it can be formed as a connecting element in a connection cable, as part of a cable terminal, or can be integrated with the starter motor. The system can be adapted to already existing self-contained networks.

Various changes and modifications may be made within the scope of the inventive concept.

I claim:

1. In an internal combustion engine and self-contained electrical network combination having
   a generator (16) having an excitation field winding (18) driven by the internal combustion engine (E):
   a battery (15) connected to the generator (16) and charged by current from the generator during operation of the engine;

a voltage regulator (19) connected to the generator, sensing output voltage therefrom and connected to control current through the field winding;

a starter motor system (11, 12, 13, 14) including a starter motor (11) and a driving connection (e2) to start the engine (E);

a starter switch (22) having an ON and an OFF position;

and a starter circuit including a series circuit of: the starter switch, the battery, the starter motor system, said series circuit, upon closing of the starter switch to ON position connecting the battery to the starter motor (11) to energize the starter motor and hence start the engine, and, after starting of the engine and upon opening of the starter switch to OFF position, to isolate the starter motor from the battery, means directly energizing the field winding (18) upon starting of the engine, and effective only upon closing of the starter switch, comprising direct connection means (28, 29) including a diode (29) connected to the series circuit at a junction (23, 24, 25) between the ON position of the starter switch (22) and the starter motor and to the field winding (18) of the generator, the diode (29) being poled in a direction to pass current from the battery (15) to the field winding (18) of the generator during starting of the engine (E) and only while the starter switch is in the ON position, said connection means being energized only upon closing of the starter switch to ON position (13, 14) for energization of the starter motor (11) thereby simultaneously, and only when said starter switch is closed, effecting a direct electrical connection from the battery (15) through the diode (29) to the field winding (18) of the generator (16) and applying power derived from the battery to the field winding during starting only and isolating said connection means from the battery upon release of the starter switch to OFF position, to provide for external excitation and hence rapid voltage build-up of the voltage of the generator while the engine is being driven by the energized starter.

2. Combination according to claim 1, wherein the connection means comprises a resistor (28) connected in series with the diode (29).

3. Combination according to claim 1, wherein the starter motor system includes a starter relay (13, 14);
and wherein the connection means is connected to an ungrounded terminal (25) of the winding (14) of the starter relay.

4. Combination according to claim 1, wherein the connection means (28, 29) is connected to an ungrounded terminal (24) of the starter motor (M; 11).

5. Combination according to claim 1, wherein the starter motor (11) is a series motor;
and wherein the connection means (28, 29) is connected to the junction (23) between the armature (11) and the field (12) of the starter motor (M).

6. Combination according to claim 1, wherein the connection means (28, 29) is connected to the junction between the voltage regulator (19) and the exciter field winding (18) of the generator.

7. Combination according to claim 1, wherein the connection means (28, 29) is connected to the junction (27) between the generator (G, 16, T; 17) and the voltage regulator (19).

8. Combination according to claim 1, wherein the generator (16, G) is an alternator having a separate rectifier providing separate rectified output (17) for the excitation field upon operation of the generator;
and wherein the connection means (28, 29) is connected to said separate field output connection (27).

9. Combination according to claim 1, wherein the connection means is built into the generator structure (G, 16).

10. Combination according to claim 1, wherein the connection means (28, 29) is built into the starter motor structure (M).

11. Combination according to claim 1, wherein the connection means includes a connection cable, said connection means forming part of said connection cable.

* * * * *